United States Patent [19]

Kardach et al.

[11] Patent Number: 5,291,604
[45] Date of Patent: Mar. 1, 1994

[54] TRANSPARENT SYSTEM INTERRUPTS WITH AUTOMATED HALT STATE RESTART

[75] Inventors: James Kardach, San Jose; Cau Nguyen, Milpitas, both of Calif.

[73] Assignee: Intel Corporation, Santa Clara, Calif.

[21] Appl. No.: 753,327

[22] Filed: Aug. 30, 1991

[51] Int. Cl.⁵ .............................................. G06F 9/46
[52] U.S. Cl. ........................... 395/725; 364/DIG. 1; 364/280.8; 364/261.4; 364/263.2
[58] Field of Search ............... 395/650, 725, 775, 800; 364/DIG. 1 MS File, DIG. 2 MS File

[56] References Cited

U.S. PATENT DOCUMENTS

| | | | |
|---|---|---|---|
| 4,200,912 | 4/1980 | Harrington et al. ................. | 395/725 |
| 4,734,882 | 3/1988 | Romagosa ........................... | 395/725 |
| 4,907,150 | 3/1990 | Arroyo et al. ............ | 364/DIG. 1 X |
| 5,027,273 | 6/1991 | Letwin ..................... | 364/DIG. 1 X |
| 5,036,458 | 7/1991 | Matsushima et al. .......... | 395/725 X |
| 5,175,853 | 12/1992 | Kardach et al. .......... | 364/DIG. 2 X |

OTHER PUBLICATIONS

07/858,323 M & A For Saving A System Image Onto Permanent Storage, Mar. 25, 1992.
07/858,301 M & A For Debugging A Computer System, Mar. 25, 1992.
07/886,965 Method & Apparatus For Servicing Transparent System Interrupts and Reducing Interrupt Latency, May 21, 1992.

*Primary Examiner*—Thomas M. Heckler
*Attorney, Agent, or Firm*—Blakely, Sokoloff, Taylor & Zafman

[57] ABSTRACT

A dedicated memory area is provided on a microprocessor system for storing a customizable system interrupt service routine, processor state data at the time of interruption and a halt indicator indicating the CPU was interrupted from a halt state. The dedicated memory area is normally not mapped as part of the main memory space, thereby keep it inaccessible to the operating system and applications. An unmaskable system supervisor interrupt having higher priority than all other maskable and unmaskable interrupts is added to the CPU interrupts. The halt state indicator is set by the added interrupt of the CPU is in a halt state at the time of interruption. A RESUME instruction is added to the CPU instructions to provide recovery of the CPU to the state before it was interrupted. The Halt instruction is re-executed by the RESUME instruction if the halt state indicator remains set at the time of restoration. As a result, a system integrator or OEM may provide transparent system level interrupts with automated halt state restart that will operate reliably in any operating environment, and be relieved of the burden of managing halt state restart.

14 Claims, 2 Drawing Sheets

TRANSPARENT SYSTEM INTERRUPTS WITH AUTOMATED HALT STATE RESTART

BACKGROUND OF THE INVENTION

1. Field of the Invention

The present invention relates to the field of microprocessor architecture. In particular, the present invention is a method and apparatus for providing transparent system interrupts with automated halt state restart.

2. Background

In the co-pending U.S. patent application Ser. No. 07/594,278, filed on Oct. 9, 1990, assigned to the assignee of the present application, Intel Corporation, entitled Transparent System Interrupt, a method and apparatus for providing transparent system interrupts is disclosed, which has particular application to microprocessor architecture. The method and apparatus disclosed in the co-pending U.S. patent application solves the problem inherent in prior art microprocessors, particularly those that have a protected mode as well as a real mode of operation, of the inability of a system integrator or original equipment manufacturer (OEM) to provide transparent system interrupts.

Transparent system interrupts are system-level interrupts that may not be relocated or overwritten by any operating system or application, thereby allowing a system integrator using the microprocessor to provide system-level interrupts that will operate reliably in any operating environment. Under the preferred embodiment disclosed in the co-pending U.S. patent application, a transparent system interrupt is invoked by the assertion of an electrical signal at an external pin of the central processing unit (CPU) chip of a microprocessor-based chip set.

Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space, and begins execution of the transparent system interrupt service routine. The transparent system interrupt routine typically comprises instructions that are unique to a particular application of the transparent system interrupts to the system in which the CPU chip is installed. Recovery from the transparent system interrupt is accomplished upon recognition of an external event that invokes a "Resume" instruction causing the CPU to be restored to exactly the same state that existed prior to the transparent system interrupt.

An important application of the transparent system interrupts is to power management functions, whereby the processor and/or other system devices may be effectively shut down during periods of non-use and then re-started without the need to go through a power-up routine. This function is particularly useful in connection with battery-operated computers where power conservation is a primary concern. Thus, for example, if a computer operator is interrupted while working with an application program, the system may be powered down to conserve battery life. When the operator returns to use the system, it is restored to the same point in the application program as if the system had been running throughout the intervening period of time. The operator need not take any action to save application program results prior to the interruption, nor reload the application program when returning to use the computer.

Under the co-pending U.S. patent application, the transparent system interrupt does not provide any specific support for interrupting the CPU during the halt state. Therefore, the transparent system service routine with application specific instructions has the responsibility for checking to determine if the CPU was interrupted during a halt state. If the CPU was interrupted during a halt state, the transparent system service routine has the further responsibility for fixing up the appropriate registers of the CPU state saved in the dedicated memory space, so that when the Resume instruction is executed to restore the CPU state, the CPU will either re-enter the halt state or continue execution with the next instruction as desired by the transparent system interrupt.

The manner in which a transparent system interrupt service routine can determine whether the CPU was interrupted during a halt state is microprocessor dependent. For the exemplary "i386 TM SX" CPU based microprocessor system discussed in the co-pending U.S. patent application, the transparent system interrupt service routine determines whether the CPU was interrupted during a halt state by polling an input-output (I/O) register. The approach of having the transparent system interrupt service routine be responsible for re-starting the CPU from an interrupted halt state has at least two disadvantages:

1) the burden of re-starting the CPU at a halt state or continued execution at the next instruction is placed on the transparent system interrupt service routine, and 2) the manner in which the CPU is restarted after it was interrupted from a halt state is microprocessor dependent.

SUMMARY OF THE INVENTION

It is therefore an object of the present invention to provide an improved transparent system interrupt with automated halt state restart.

Under the present invention, a transparent system interrupt is invoked by the assertion of an electrical signal at an external pin of the central processing unit (CPU) chip of a microprocessor-based chip set. Upon assertion of the electrical signal at the external pin of the CPU chip, the CPU maps a normally unmapped dedicated random access memory (RAM) area where the transparent system interrupt service routine is stored as a pre-determined area of the main memory space, saves the current CPU state into the dedicated RAM space including an instruction pointer and a prior instruction pointer, sets a halt indicator in the dedicated RAM space if the CPU is being interrupted from a halt state, and begins execution of the transparent system interrupt service routine.

The transparent system interrupt service routine typically comprises instructions that are unique to a particular application of the transparent system interrupts to the system in which the CPU chip is installed. Optionally, the transparent system interrupt service routine may further comprise instructions for checking the halt indicator and resetting the halt indicator if the CPU is to be restored to continued execution with the next instruction instead of the halt state.

Recovery from the transparent system interrupt is accomplished upon recognition of an external event that invokes a "Resume" instruction causing the CPU to be restored to exactly the same state that existed prior to the transparent system interrupt or automatically restarted from the halt state. During restoration of the CPU state, the "Resume" instruction checks the halt indicator, and conditionally decrement the restored instruction pointer to the restored prior instruction pointer if the halt indicator is set, thereby causing the prior instruction, that is the "Halt" instruction, to be re-executed and the CPU to be restored at the halt state, instead of continued execution at the next instruction.

BRIEF DESCRIPTION OF THE DRAWINGS

The objects, features and advantages of the present invention will be apparent from the following detailed description of the preferred embodiment of the invention with references to the drawings in which.

DETAILED DESCRIPTION

System Overview

Figure 1:
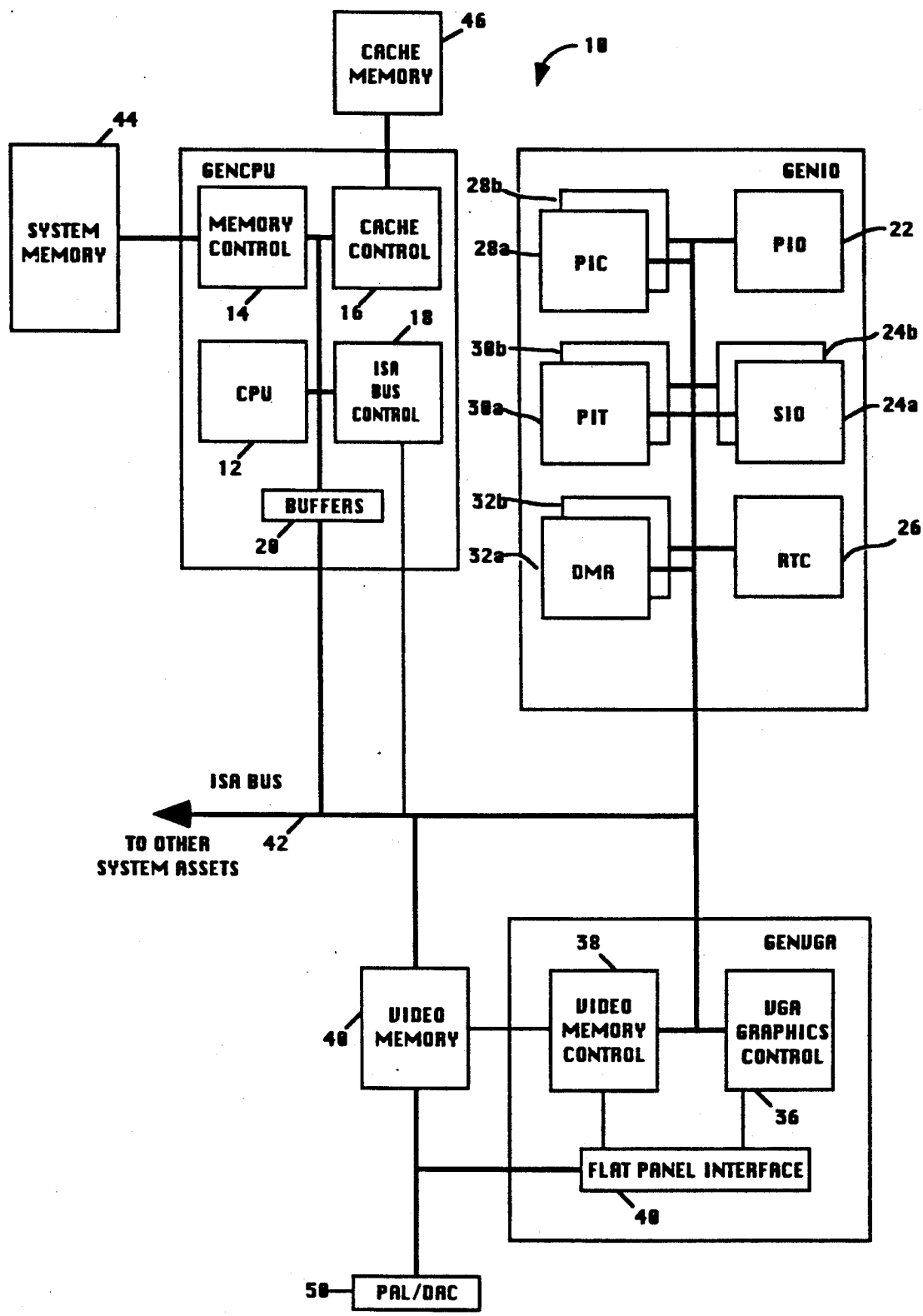
FIG. 1 is a functional block diagram of an exemplary microprocessor system embodying the present invention.

Referring now to FIG. 1, a block diagram illustrating an exemplary microprocessor system embodying the present invention is shown. The exemplary microprocessor system is briefly described below; however, it is to be understood that the present invention is not limited to this particular microprocessor design, and may be incorporated in virtually any processor design.

The exemplary microprocessor system 10 comprises three main components, designated as GENCPU, GENIO and GENVGA. GENCPU is an expanded central processing unit; GENIO is a single chip input-/output unit; and GENVGA is a single chip graphics interface. The three components communicate with each other and with other system components (such as expansion slots, keyboard controller, disk controllers) via ISA bus 42.

GENCPU includes a CPU 12, a memory controller 14, a cache controller 16, ISA bus control logic 18 and line buffers 20. CPU 12 has at least two modes of operations, a real mode and a protected mode. CPU 12 is essentially a "i386 TM SX" CPU manufactured by Intel Corporation, the corporate assignee of this invention. Throughout this description, certain terminology relating to the "i386 TM SX" CPU, such as register names, signal nomenclature, is employed to described the present invention. Such terminology is understood by practitioners in the field of microprocessor design and will therefore not be explained at length herein.

In particular, CPU 12 comprises an instruction pointer register (not shown) and a prior instruction pointer register (not shown) containing an instruction pointer and a prior instruction pointer respectively. The instruction pointer controls instruction fetching. CPU 12 automatically increments the instruction and prior instruction pointers pointing to the next instruction to be executed and the instruction just executed after executing an instruction.

CPU 12 also comprises logics (not shown) for executing a plurality of instructions. The instructions comprise a "Halt" instruction for stopping program execution and preventing the CPU 12 from using the local bus until the CPU 12 is restarted. The instructions operate on either zero, one, two or three operands. An operand either resides in the instruction, in a register or in a memory location. CPU 12 has two modes of operations, a real mode and a protected mode. The primary differences between the real mode and the protected mode is how a logical address is translated into a linear address, the size of the address space, and paging capability.

Additionally, CPU 12 comprises logics (not shown) for executing a plurality of hardware interrupts. Hardware interrupts occur as the result of an external event and are classified into two types: maskable and non-maskable. Interrupts are serviced after execution of the current instruction. After the interrupt service routine is finished with servicing the interrupt, execution proceeds with the instruction immediately after the interrupted instruction. Maskable interrupts are typically used to respond to asynchronous external hardware events. Unmaskable interrupts are typically used to service very high priority events.

For further description relating to the registers and internal structure of CPU 12, see i386 TM SX Microprocessor, published by Intel Corporation as publication number 240187, and related publications.

GENIO includes parallel ports (PIO) 22, dual serial ports (SIO) 24a, 24b, real time clock unit (RTC) 26, dual programmable interrupt controllers (PIC) 28a, 28b, dual programmable timers (PIT) 30a, 30b, and dual direct memory access controllers (DMA) 32a, 32b. GENVGA includes VGA graphics controller 36, video memory controller 38 and interface 40 for a flat panel display unit.

Additionally, external to the three main components are system memory 44, cache memory 46, video memory 48, and an interface (PAL/DAC) 50 for a conventional VGA monitor. The system memory 44, the cache memory 46 and video memory 48 are accessed by the memory controller 14, cache memory controller 16 and video memory controller 38 respectively. The video memory 48 may also be accessed through the ISA bus 42, and the two interfaces 40, 50.

For further description relating to the "i386 TM SX" Microprocessor, see i386 TM SX Microprocessor Hardware Reference Manual, published by Intel Corporation as publication number 240332, and related publications.

Transparent System Interrupt with Automated Halt State Restart

The present invention is implemented by means of three enhancements to a conventional prior art microprocessor architecture, for example, the assignee's "i386 TM " architecture, as follows:

1. A new interrupt called the System Supervisor interrupt (SSI) for superseding the entire microprocessor system's protection mechanism with specific support for superseding the protection mechanism while the CPU is at the halt state. The SSI interrupt is non-maskable and has a higher priority than all other interrupts, including other non-maskable interrupt. The SSI interrupt is serviced by a SSI interrupt service routine.

2. A special system transparent memory area referred to as System Management RAM or SMRAM for storing the SSI interrupt service routine, the state of the CPU at the time it was interrupted, and a halt state indicator. The halt state indicator indicating whether the CPU was interrupted from a halt state.

3. A new instruction, called RESUME, for returning the microprocessor system to the state just before it was interrupted by an SSI interrupt and resuming execution at the next instruction, or optionally returning to the halt state if the CPU was interrupted from a halt state.

Figure 2:
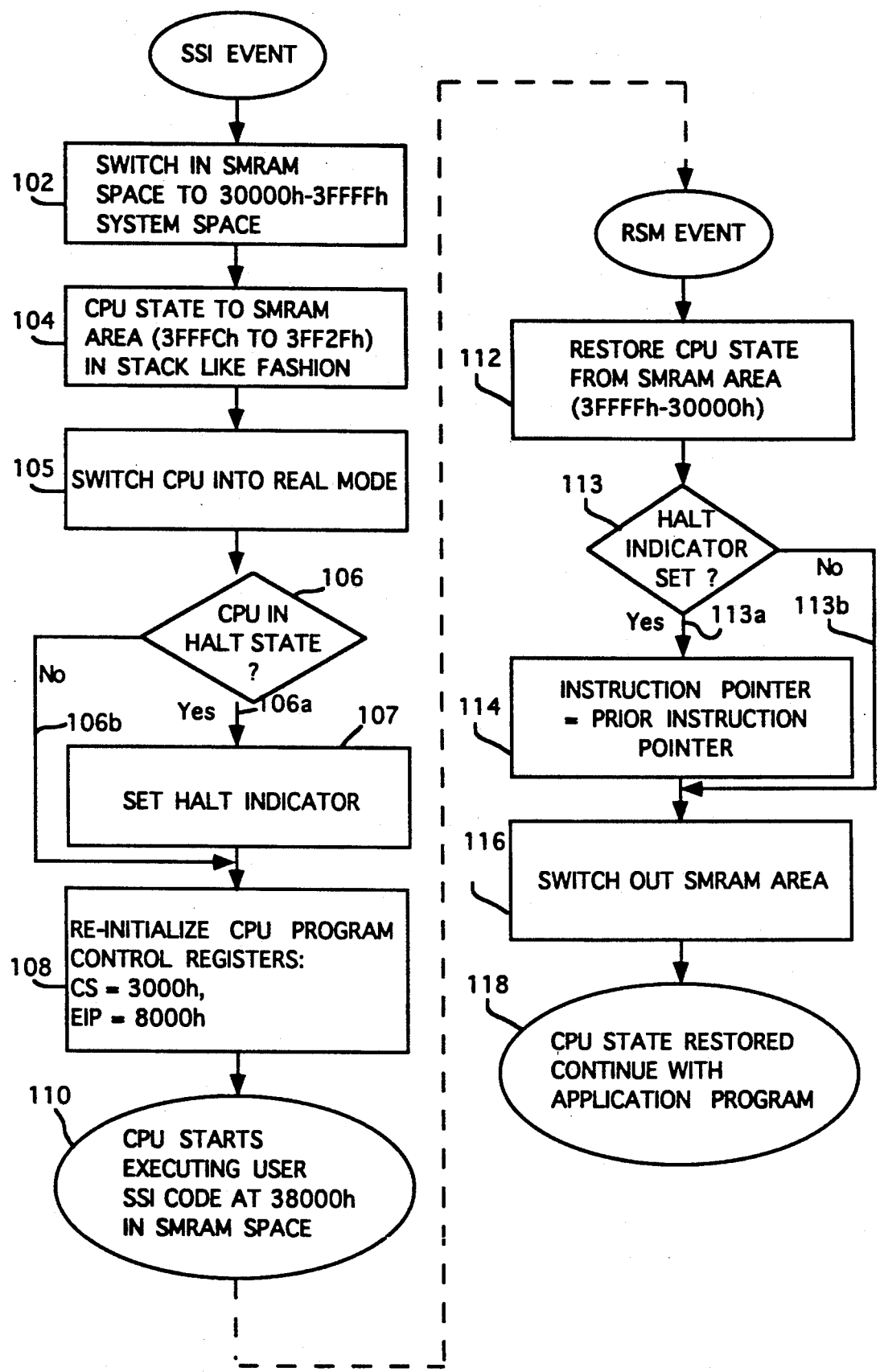
FIG. 2 is a functional flow diagram of the microcode for the transparent system interrupt with automated halt restart of the present invention.

Referring now to FIG. 2, a flow chart illustrating the microcode of the SSI interrupt of the present invention is shown. A SSI interrupt is invoked by the assertion of an electrical signal at an external pin of the CPU chip. Upon detection of the electrical signal at the external pin of the CPU chip (SSI event), the CPU maps the SMRAM as a pre-determined area of main memory space, block 102. The SMRAM is normally not mapped as part of the main memory space, thereby making it inaccessible to the operating system and the application. Additionally, the CPU saves the CPU state into the SMRAM space, block 104, switches the CPU into real mode, block 105, sets the halt indicator in the SMRAM space, block 107, if the CPU is being interrupted from a halt state resulted from having executed the Halt instruction, branch 106a, re-initializes the CPU's program control registers, block 108, and starts execution of the SSI interrupt service routine, block 110.

The CPU state saved comprises an instruction pointer and a prior instruction pointer. These two pointers point to two instructions of the operating system and/or the applications. The instruction pointer points to an instruction to be executed next by the CPU, and the prior instruction pointer points to an instruction executed by the CPU before the interrupt, that is, the "Halt" instruction if the CPU was interrupted from the halt state.

The SSI interrupt service routine typically comprises instructions that are unique to a particular application of the SSI interrupt to the system in which the CPU chip is installed. Additionally, the SSI interrupt service routine may contain instructions for checking whether the halt indicator in the SMRAM space is set, to determine whether the CPU was interrupted at the halt state. If the halt indicator is set, the SSI interrupt service routine may further contain instructions for resetting the halt indicator to cause the CPU to be restored to continued execution at the next instruction upon execution of the "RESUME" instruction.

Recovery from the SSI interrupt is accomplished upon recognition of an external event that invokes the "Resume" instruction (RSM event). Upon detection of the external event, the CPU restores the CPU state stored in the SMRAM area including the instruction pointer and the prior instruction pointer, block 112, checks to determine if the halt indicator is set, block 113. If the halt indicator is set, branch 113a, the CPU decrements the restored instruction pointer to the restored prior instruction pointer, block 114. If the halt indicator is not set, branch 113b, or upon decrementing the instruction pointer register, block 114, the CPU switches out the SMRAM area and unmaps it as part of the main memory space, block 116, and continues execution of the interrupted operating system or application program, block 117. Therefore, if the halt indicator remains set upon returning from the system interrupt service routine, the "Halt" instruction gets re-executed, thereby causing the CPU to remain in the halt state. However, if the halt indicator is not set upon returning from the system interrupt service routine, the next instruction gets executed.

Except saving the instruction and prior instruction pointers, setting the halt indicator, checking the halt indicator and decrementing the instruction pointer described above, these enhancements, including a specific application of the SSI interrupt, the power management interrupt (PMI), are described in detail in the co-pending U.S. patent application, which is hereby fully incorporated by reference.

While the method of the present invention has been described in terms of its presently preferred form, those skilled in the art will recognize that the method of the present invention is not limited to the presently preferred form described. The method of the present invention may be practiced with modification and alteration within the spirit and scope of the appended claims. The specifications and drawings are, accordingly, to be regarded in an illustrative rather than a restrictive sense.

What is claimed is:

1. An improved microprocessor system comprising a central processing unit (CPU) coupled to at least one memory unit for executing an operating system and at least one application program comprising a plurality of said CPU's instructions, said CPU further having at least two modes of program execution, a real mode and a protected mode, and at least one interrupt for interrupting program execution, wherein the improvement to said microprocessor system comprises:

(a) said memory units having a dedicated memory area for storing an interrupt processing program, processor state data of said CPU, and a halt indicator, said dedicated memory area being not mapped as part of main memory space thereby keeping said dedicated memory area inaccessible to said operating system and application programs, said processor state data comprising an instruction pointer and a prior instruction pointer pointing to first and second instructions of said operating system and application programs respectively, said first instruction being an instruction to be executed next by said CPU and said second instruction being an instruction executed by said CPU before an interrupt, said halt indicator indicating whether said CPU is interrupted from an halt state that resulted from execution of a Halt instruction, said instructions comprising said Halt instruction;

(b) said interrupts having a System Supervisor Interrupt (SSI) for interrupting execution of said operating system and said application programs, switching in and mapping said dedicated memory area to a pre-determined segment of said main memory space, storing said processor state data of said CPU into said dedicated memory area including said instruction and prior instruction pointers, switching said CPU into said real mode of execution, determining if said CPU is being interrupted from said halt state, conditionally setting said halt indicator to so indicate if said CPU is being interrupted from said halt state, and starting execution of said interrupt processing program, said SSI being unmaskable by said operating system and said application programs, and having a higher priority than other interrupts;

(c) said instructions having a Resume instruction for restoring said saved processor state data from said dedicated memory area to said CPU including said instruction and prior instruction pointers, checking said halt indicator to determine if it is set, conditionally decrementing said restored instruction pointer to said restored prior instruction pointer if said halt indicator is set, switching out and unmapping said dedicated memory area to said main memory space, and resuming execution of said operating system and said application programs;

thereby allowing said CPU to be interrupted reliably and automated halt state restart be provided to said interrupt service program in a manner transparent to said operating system and said application programs.

2. The improved microprocessor system as set forth in claim 1, wherein said memory units comprises on-board random access memory (RAM), and said dedicated memory area is part of said on-board RAM.

3. The improved microprocessor system as set forth in claim 1, wherein said memory units comprises off-board RAM coupled to an on-board RAM controller, and said dedicated memory area is part of said off-board RAM.

4. The improved microprocessor system as set forth in claim 1, wherein said CPU comprises interrupt means for triggering said interrupts including said SSI, said SSI being triggered upon receipt of an electrical signal, said interrupt means comprising an interface for receiving said electrical signal.

5. The improved microprocessor system as set forth in claim 4, wherein said interface is an external circuit pin.

6. The improved microprocessor system as set forth in claim 4, wherein said microprocessor system further comprises an event detection means coupled to at least one system asset of said microprocessor system and said interrupt means for detecting a pre-determined event associated with said system asset and generating for said interface said electrical signal upon said detection.

7. The improved microprocessor system as set forth in claim 1, wherein said CPU comprises instruction means for executing said instructions including said Halt instruction and said Resume instruction.

8. In a microprocessor system comprising a central processing unit (CPU) coupled to at least one memory unit for executing an operating system and at least one application program comprising a plurality of said CPU's instructions, said CPU further having at least two modes of program execution, a real mode and a protected mode, and at least one interrupt for interrupting program execution, a method for reliably interrupting said CPU and providing automated halt state restart in a manner transparent to said operating system and application programs comprising the steps of:

(a) storing an interrupt processing program in a dedicated memory area on said memory units, said dedicated memory area being not mapped as part of main memory space thereby keeping said dedicated memory area inaccessible to said operating system and application programs;

(b) interrupting execution of said operating system and said application programs upon receipt of a pre-determined input, said interruption being unmaskable by said operating system and said application programs, and having a higher priority than other interruptions;

(c) switching in and mapping said dedicated memory area to a pre-determined segment of said main memory space;

(d) storing processor state data of said CPU into said dedicated memory area, said processor state data comprising an instruction pointer and a prior instruction pointer pointing to first and second instructions of said operating system and application programs, said first instruction being an instruction to be executed next by said CPU and said second instruction being an instruction executed by said CPU before said interrupt;

(e) determining if said CPU is being interrupted from a halt state that resulted from execution of a Halt instruction, and if said CPU is being interrupted from said halt state, setting a halt indicator to so indicate, and storing said halt indicator in said dedicated memory area, said instructions comprising said Halt instruction;

(f) switching said CPU into said real mode of execution;

(g) starting execution of said interrupt processing program;

(h) restoring said saved processor state data including said instruction and prior instruction pointers from said dedicated memory area to said CPU, said restoration being controlled by said interrupt processing program;

(i) determining if said halt indicator is set, and if said halt indicator is set, decrementing said restored instruction pointer to said restored prior instruction pointer;

(j) switching out and unmapping said dedicated memory area to said main memory space; and (k) resuming execution of said operating system and said application programs.

9. The method as set forth in claim 8, wherein said memory units comprises on-board random access memory (RAM), and said dedicated memory area is part of said on-board RAM.

10. The method as set forth in claim 8, wherein said memory units comprises off-board RAM coupled to an on-board RAM controller, and said dedicated memory area is part of said off-board RAM.

11. The improved microprocessor system as set forth in claim 8, wherein said steps (b) through (g) are performed by interrupt means of said CPU upon receipt of an electrical signal, said interrupt means comprising an interface for receiving said electrical signal.

12. The method as set forth in claim 11, wherein said interface is an external circuit pin.

13. The method as set forth in claim 11, wherein said electrical signal is generated and provided to said interface by an event detection means coupled to at least one system asset of said microprocessor system and said interrupt means upon detection of a pre-determined event associated with said system asset.

14. The method as set forth in claim 11, wherein said steps (h) through (k) are performed by instruction means of said CPU, and said Halt instruction is executed by said instruction means.

* * * * *